United States Patent [19]

Zhang

[11] Patent Number: 4,888,987

[45] Date of Patent: Dec. 26, 1989

[54] HIGH SENSITIVITY MEASUREMENT DEVICE FOR MEASURING VARIOUS PARAMETERS OF NON-ELECTRIC QUANTITY

[76] Inventor: Kaixun Zhang, No. 1, Jiao Chang Kou, De Wai, Beijing, China

[21] Appl. No.: 118,220

[22] Filed: Nov. 6, 1987

[30] Foreign Application Priority Data

Nov. 18, 1986 [CN] China .................................. 86107738

[51] Int. Cl.$^4$ ................................................ G01F 1/68
[52] U.S. Cl. ................................. 73/204.14; 73/204.15; 73/204.17; 73/204.23; 374/43; 374/45
[58] Field of Search ................ 73/204, 204.23, 204.17, 73/204.15, 204.14; 374/43, 44, 45

[56] References Cited

U.S. PATENT DOCUMENTS

| | | | |
|---|---|---|---|
| 3,498,128 | 3/1970 | Calvet | 374/163 |
| 3,905,230 | 9/1975 | Calvet et al. | 73/204 |
| 3,968,685 | 7/1976 | MacHattre | 73/204.23 |
| 3,988,928 | 11/1976 | Edstrom et al. | 73/204 |
| 3,992,940 | 11/1976 | Platzer, Jr. | 73/204 |
| 4,304,129 | 12/1981 | Kawai et al. | 73/204 |
| 4,399,697 | 8/1983 | Kohama et al. | 73/204 |
| 4,587,843 | 5/1986 | Tokura et al. | 73/204 |

Primary Examiner—Herbert Goldstein
Attorney, Agent, or Firm—Balogh, Osann, Kramer, Dvorak, Genova & Traub

[57] ABSTRACT

A sensing element is constituted by a single or plurality of p-n junctions alternating between the foward and reverse states. A pulse circuit applies different magnitudes of foward and reverse currents to the sensing element. A high reverse current is applied for a self heating interval and a small foward current is applied for a sensing interval.

12 Claims, 4 Drawing Sheets

HIGH SENSITIVITY MEASUREMENT DEVICE FOR MEASURING VARIOUS PARAMETERS OF NON-ELECTRIC QUANTITY

BACKGROUND OF THE INVENTION

1. Field of the Invention

The present invention relates to a measurement field of electronics and, more particularly, to a high sensitivity measurement device for measuring various parameters of non-electric quantity.

2. Description of the Prior Art

By utilizing the heat-sinking principle, based on the variation of the heat exchange nature of a measured object, the device and method for measuring various parameters of non-electric quantity have nowadays become important measures of electronics in the measurement of wind speed, flow rate, material composition, gas concentration, humidity, vacuum, heat conductivity, etc. The typical schemes are embodied in the instruments such as hot wire anemometer, hot film flowmeter, and heat conduction carbon oxide concentration tester, which have disadvantages of sensor easy to be damaged, large power dissipation, appreciable interference to the measured object, and difficulty of miniaturizing the instrument. However, until now there are no satisfactory arrangements to replace them. In recent years, the device and the method adopting semiconductor means acted as sensing element for carrying out above mentioned measurements have been presented. The typical arrangements of such can be known from U.S. Pat. No. 3,988,928, U.S. Pat. No. 3,992,940, etc., the main drawbacks of which are as follows: both the heating body and the temperature sensing element of the sensor are not located at the same spatial position, and it is necessary to perform the thermal coupling inside the sensor through an intermediate medium, so that the sensor has large heat inerts and is hard to obtain signals representing fast changing parameters of non-electric quantity. Besides, the fact that the heating process and the temperature measurement process affect each other not only reduces the measuring accuracy but also brings many difficulties to the signal processing. So far, it is difficult for the existing schemes to realize high responding speed, high sensitivity and high resolution measurements of wind speed, flow rate, material composition, gas concentration, humidity, vacuum, heat conductivity, etc. The instrument industries have been waiting for a new breakthrough related to the principle of measurement.

SUMMARY OF THE INVENTION

In the present invention, a new measurement principle is presented, and, in accordance with this principle, a new device and method are adopted to obtain various parameters of non-electric quantity by utilizing different physical position, and, to realize non-inertia measurement with zero internal thermal-resistance, by means of a very small sensing element operating under the low power condition so as to achieve fast and high accurate measurement for parameters of wind speed, flow rate, liquid level, material composition, gas concentration, humidity, water content of material, slight displacement, mechanical vibration, adhesiveness, vacuum, heat conductivity, etc.

Moreover, with the aid of a feedback system, the sensing element of the present invention can be used as a micro-heat-source having constant temperature.

The object of the present invention is to use a single p-n junction or a plurality of p-n junctions connected in series in the same direction as the sensing element, which alternatively operates in two states of reverse breakdown and forward conduction, and to utilize the heat produced in the reverse breakdown period to make the temperature of the sensing element higher than that of the tested medium to which heat is transferred and to measure electric signal related to heat exchange nature of the measured medium, i.e., electric signal corresponding to the parameters of the measured medium. According to the present invention, on the basis that the sensing element alternatively operates in two states of reverse breakdown and forward conduction, the electric signals which reflect the flow rate, flow velocity, heat conductivity, composition, change of vacuum, etc., of the tested medium can be obtained, by measuring the change of the heating power or heating current of the sensing element in the reverse breakdown period or by measuring the change of the forward voltage of the sensing element in the forward conduction period.

Specifically, the p-n junction of the sensing element alternatively operates in two different states of forward conduction with small current and reverse breakdown with large current. When in the case that the electric signals produced by the sensing element and corresponding to the measured parameter take the form of forward voltage, the reverse current $I_r$ is kept unchanged (for example, peak value of 20mA). The variation of the ambient temperature will cause the variation of the forward voltage of the p-n junction during its forward conduction period, and the related parameter measured can be obtained by measuring such variation of the forward voltage. Because the p-n junction has the characteristic of voltage stabilization in its reverse breakdown state, it will keep a constant reverse voltage $V_r$ (for example, 10 V), thus maintaining a constant heating power $I_r V_r$ (for example, 200 mW), whereas the forward current $I_F$ is controlled to be a very small value during the forward conduction (for example, 10 UA). Since its forward voltage drop $V_F$ also has a small value, for example, approximately 0.6 V for a silicon p-n junction and the forward heating power is $I_F V_F$ (for example, 0.006 mW), it is considered that there is no heating effect during the forward conduction period. Owing to the very high alternative frequency (for example, 10,000 HZ), under which a p-n junction operates in two states of heating with large current during the reverse breakdown period and temperature measurement with small current during the forward conduction period, the hysteresis free measurement and the ideally quick respondence can be achieved. When in the case that the electric signals produced by the sensing element and corresponding to the measured parameter take the form of reverse heating current or heating power, the magnitude of the forward voltage pulse series of the p-n junction is kept unchanged, the variation of the ambient temperature will cause the magnitude variation of the reverse breakdown current pulse series of the p-n junction, and the related parameter measured can be obtained by measuring such current variation. By way of example, when the magnitude of forward pulse voltage is kept of 0.6000 V, the magnitude of the reverse current pulse will change within the range of ±3 mA.

The high sensitivity measurement device in accordance with the present invention for measuring parameters of non-electric quantity comprises a sensing element constituted by a single p-n junction or a plurality of p-n junctions connected in series in the same direction, which can alternatively operate in two states of reverse breakdown and forward conduction and directly contacts with the tested medium for heat exchange; a pulse signal generator, the output voltage polarity of which alternatively changes, for providing with a voltage whose polarity changes alternatively; a pulse signal separator connected between the sensing element and the pulse signal generator for providing the sensing element with different magnitudes of backward and forward currents in accordance with the output voltage of the pulse signal generator; and an electric signal measurement means for measuring the pulse series of electric signals related to the sensing element and reflecting the parameters of the tested medium, thus attaining the object of the present invention.

DESCRIPTION OF THE PREFERRED EMBODIMENTS

Figure 1:
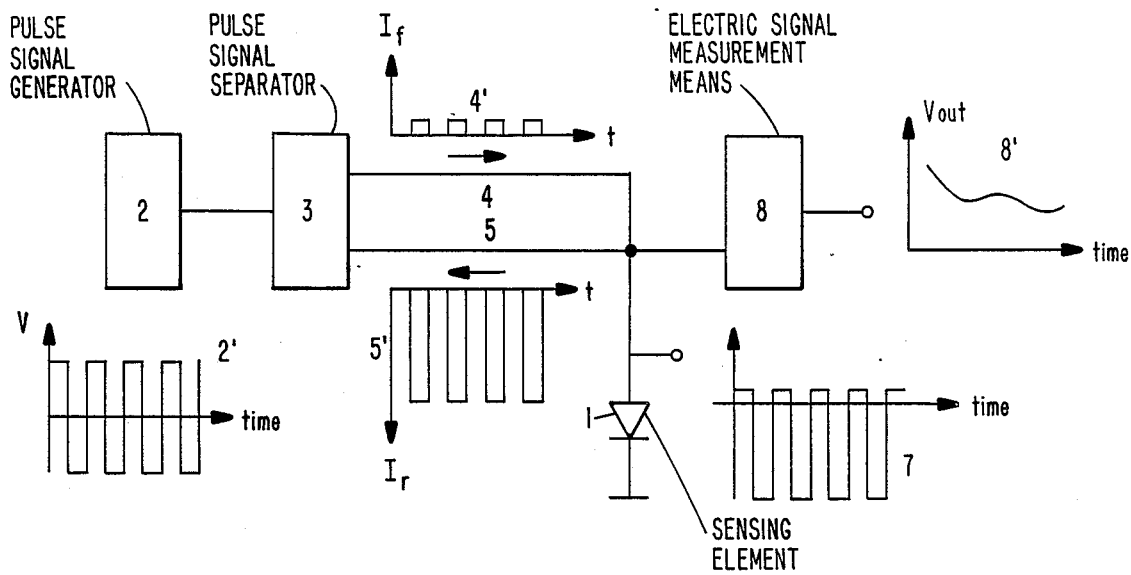
FIG. 1 is a schematic diagram illustrating the operation mode of the high sensitivity measurement device for measuring various parameters of non-electric quantity according to the present invention.

FIG. 1 shows a schematic diagram for illustrating the operation mode of the measurement device according to the present invention. After being divided into two parts by the pulse signal separator 3, the output voltage of the pulse signal generator 2, through branch circuits 4 and 5, alternatively and respectively provide the sensing element 1 with different magnitude reverse and forward currents, the waveforms of which are schematically shown in FIG. 1 and designated by reference numerals 5 and 4, respectively. For example, in the case of keeping the reverse current pulse magnitude of the p-n junction unchanged and measuring the forward voltage drop of the p-n junction, the electric signal measurement 8 can be connected to the positive polarity of the p-n junction, for processing the positive and negative voltage pulse series having different magnitudes across the sensing element 1 as shown by reference numeral 7 in FIG. 1, and measuring the forward voltage pulse series corresponding to the measured parameter, thus obtaining the desired measurement signals as shown by 8' FIG. 1. The electric signal measurement means 8 is for measuring the pulse series of electric signals related to the sensing element and reflecting the parameters of the tested medium. In fact, the pulse, signal separator is a circuit having different impedances for forward and backward currents, which limits the forward current pulse magnitude of the p-n junction to a very small value (for example, 10 uA), and makes the reverse breakdown current pulse magnitude of the p-n junction keep a sufficient large value, for example, 20 mA.

Referring now to the other drawings, the embodiments of the present invention will be described hereinafter.

Figure 2:
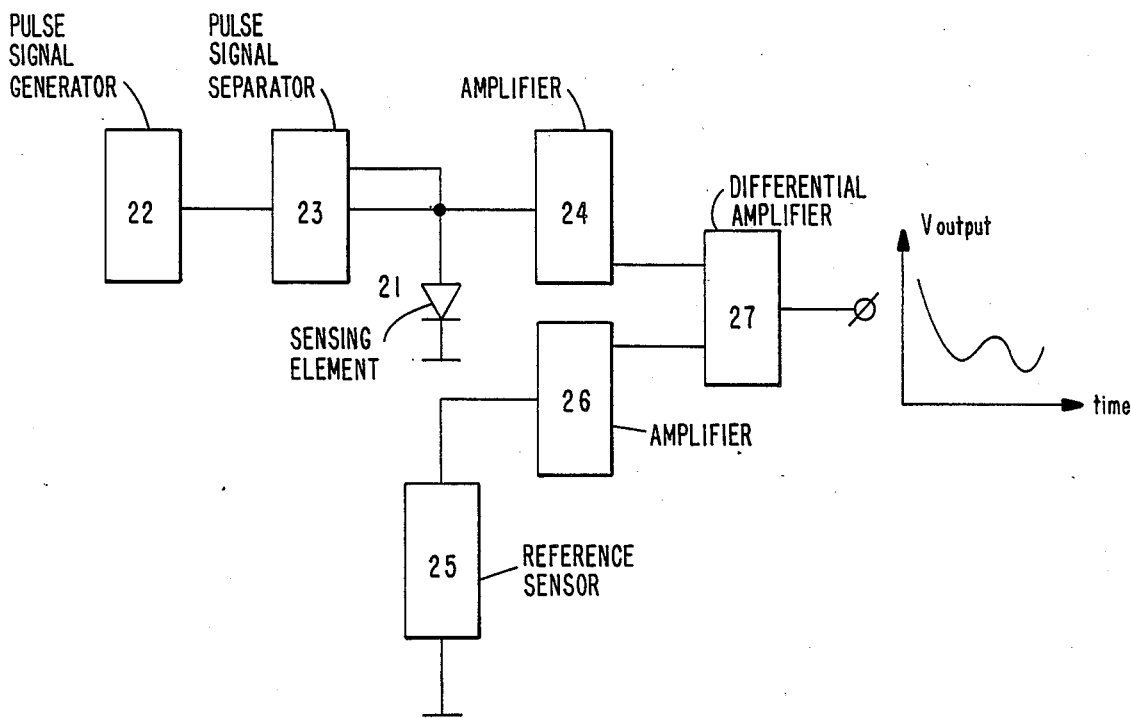
FIG. 2 is a schematic diagram of one embodiment for illustrating the measurement device of the present invention.

FIG. 2 shows an embodiment of the measurement device of the present invention. In FIG. 2, 22 represents pulse signal generator, 23 pulse signal separator, 21 sensing element. The reference sensing element 25, amplifiers 24 and 26, and differential amplifier 27 construct the electric signal measurement means. During sensing process element 21 is fed with a heating power with a constant value. Amplifier 24, the input of which is connected with the positive terminal of the sensing element 21, amplifies the pulse series of forward voltage drop across the element 21. Reference sensor 25, which can also be constituted by for example, a p-n junction or a plurality of p-n junctions connected in series in the same direction, is used to measure the temperature of the ambience near to the position where the sensing element 21 is placed. The output of reference sensor 25 is connected to the input of amplifier 26 which amplifies the voltage signal coming from reference sensor 25 and corresponding to the temperature of the ambience where the sensing element 21 is placed. Differential amplifier 27, the two inputs of which are connected with the outputs of amplifiers 24 and 26 respectively, is used to obtain the electric signals corresponding to the parameters of the tested medium.

Figure 3:
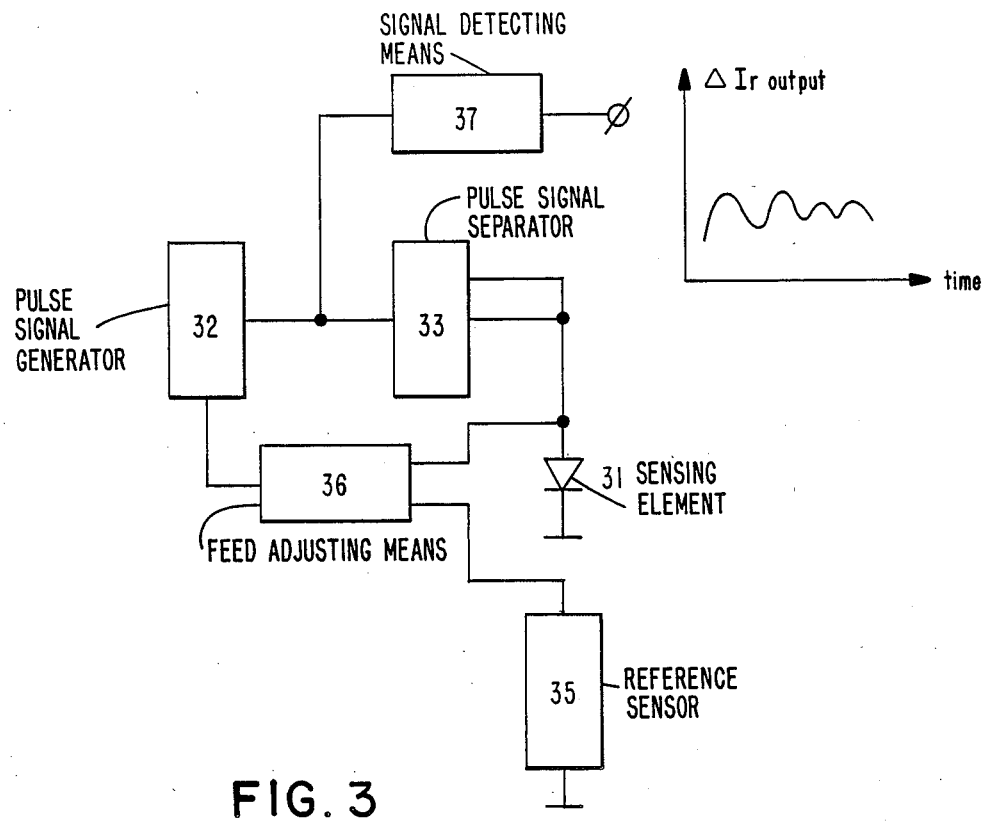
FIGS. 3 to 6 are schematic diagrams of other embodiments for explaining the measurement device according to the present invention, respectively.

FIG. 3 schematically shows an embodiment of the measurement device of the present invention. Reference numerals 31, 32 and 33 designate sensing element, pulse signal generator and pulse signal separator respectively. Electric signal measurement means is constituted by reference sensor 35, feedback adjusting means 36, and signal detecting means 37. Reference sensor 35, which can be constructed by, for example, a single p-n junction or a plurality of p-n junctions connected in series in the same direction, tests the temperature of the ambience near to the position where the sensing element 31 is placed. Feedback adjusting means 36, whose two inputs and an output are connected to the output of the reference sensor 35, the positive terminal of the element 31, and pulse signal generator 32 respectively, output a signal which adjusts the output power of the pulse signal generator so as to keep a constant value of difference between the temperature of sensing element 31 and reference sensor 35 in the measurement process. Signal detecting means 37 whose input is connected to the output of the pulse signal generator 32 detects the electric signal reflecting the change of the output power from the pulse signal generator, for obtaining the signal of the reverse current change $\Delta I_r$, which reflects the parameters of the tested medium.

Figure 4:
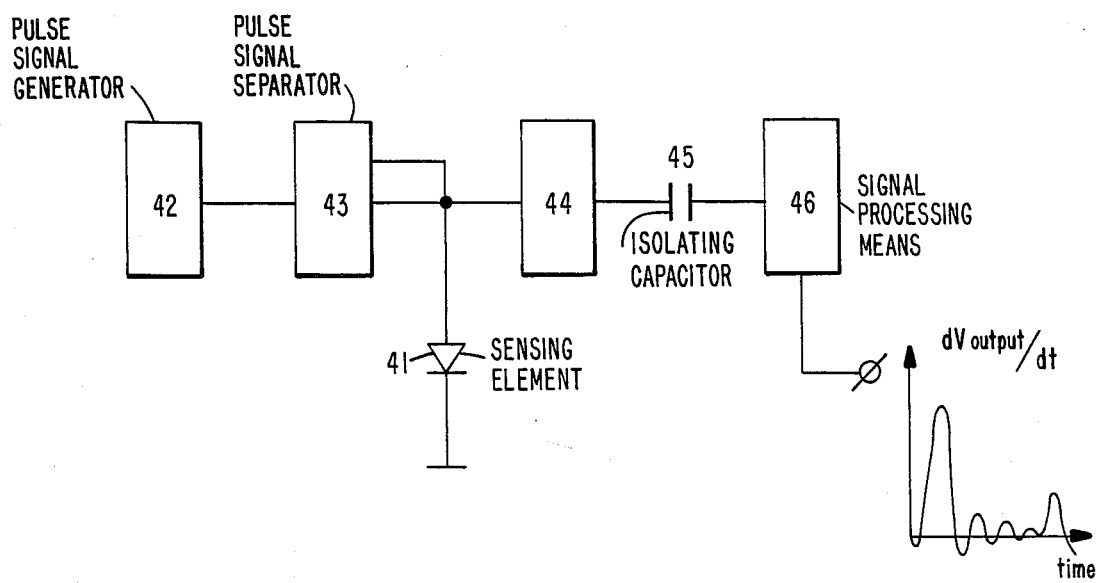

The embodiment shown in FIG. 4, is used to measure the rates of the parameters of the tested medium. The pulse signal generator, pulse signal separator, and sensing element of the present invention are designated by 42, 43 and 41. Electric signal measurement means is constituted by amplifier 44, isolating capacitor 45, and signal processing means 46. Amplifier 44, the input of which is connected with the positive terminal of the sensing element 41, is used for amplifying the forward voltage drop across the sensing element 41. The isolating capacitor 45 having its one terminal connected with the output of the amplifier 44 blocks the D.C. component of the output signal from the amplifier 44. Signal processing means 46, such as an amplifier or a trigger, has its input connected to the other terminal of isolating capacitor 45, and is used to obtain an electric signal (dv/dt) which reflects the rates of parameters of the tested medium. This embodiment can be employed to test the liquid level, vibration of medium, etc.

Figure 5:
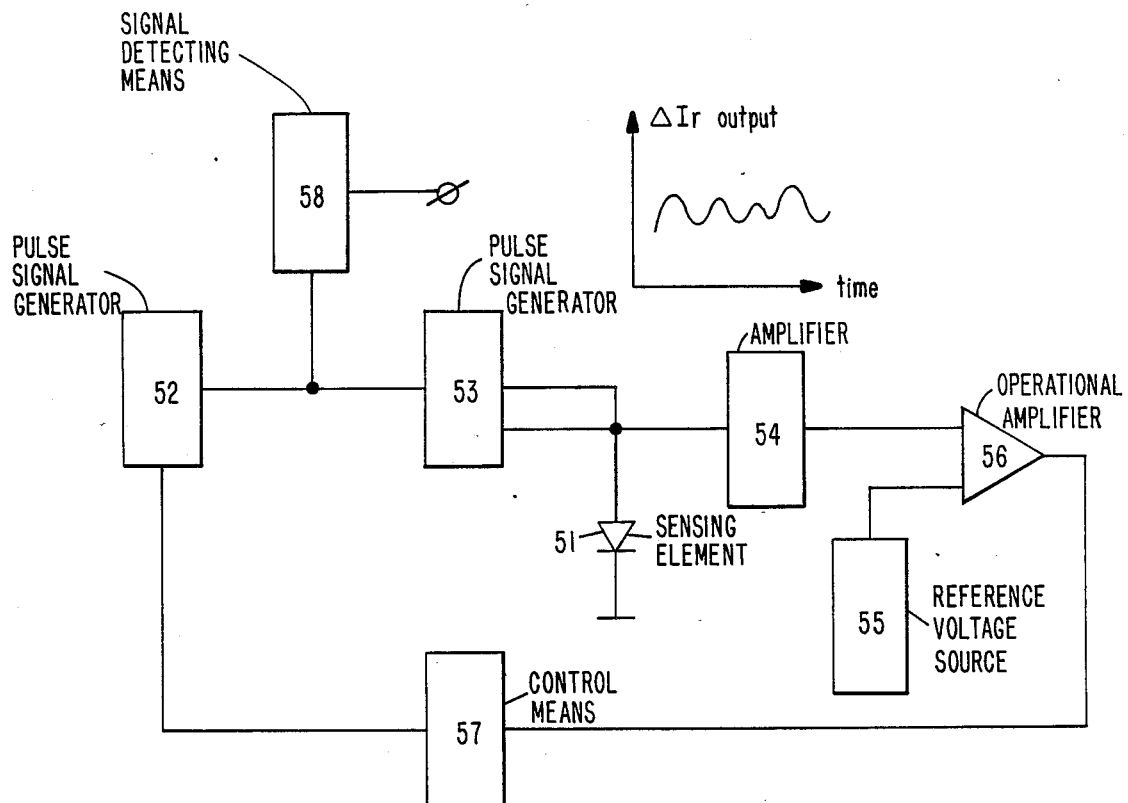

The embodiment shown in FIG. 5 operates in a form of constant temperature source. The present invention, therefore, further offers a high accurate constant temperature source device. During measurement, the temperature of sensing element 51 always keeps constant. The signal generator, pulse signal separator, and sensing element are designated by reference numerals 52, 53 and 51. In FIG. 5, amplifier 54 having its input connected to the positive terminal of sensing element 51 is used to amplify the pulse series of forward voltage drop across sensing element 51. Direct current (D.C) reference voltage source 55 is used to provide a D.C. reference voltage. Operational amplifier 56, whose two inputs are connected with the outputs of both amplifier 54 and D.C. reference voltage source 55, produces a signal corresponding to the change of temperature. Control means 57 having its input connected to the output of operational amplifier 56 produces a control signal to control the output power of pulse signal generator 52, so as to make the temperature of the sensing element 51 unchanged. Signal detecting means 58, the input of which is connected with the output of pulse signal generator 52, is used to detect the electric signals reflecting the change of the output power of pulse signal generator 52, thus obtaining the electric signals corresponding to the parameters of the tested medium.

Figure 7:
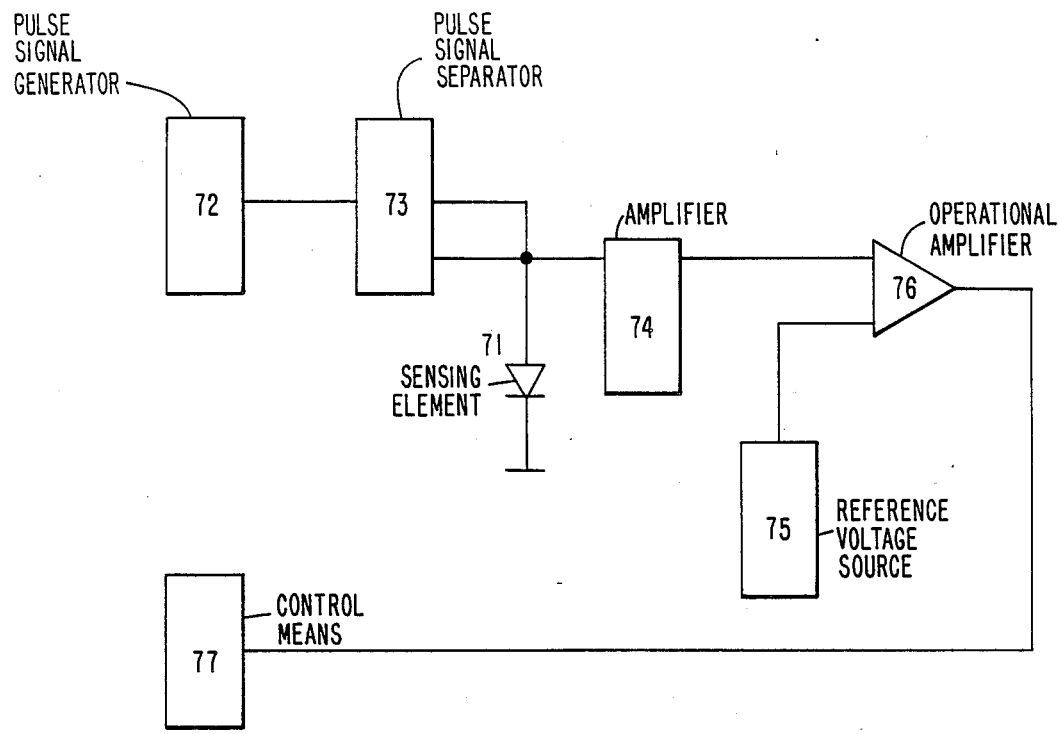
FIG. 7 is a schematic diagram of an embodiment of a micro-heat-source with high accurate constant temperature, which is constituted by the main portions of the construction of the measurement device according to the present invention.

In the above mentioned embodiment, when the signal detecting means 58 is removed, the whole means will become a micro-constant-temperature source with high accuracy, as shown in FIG. 7.

Figure 6:
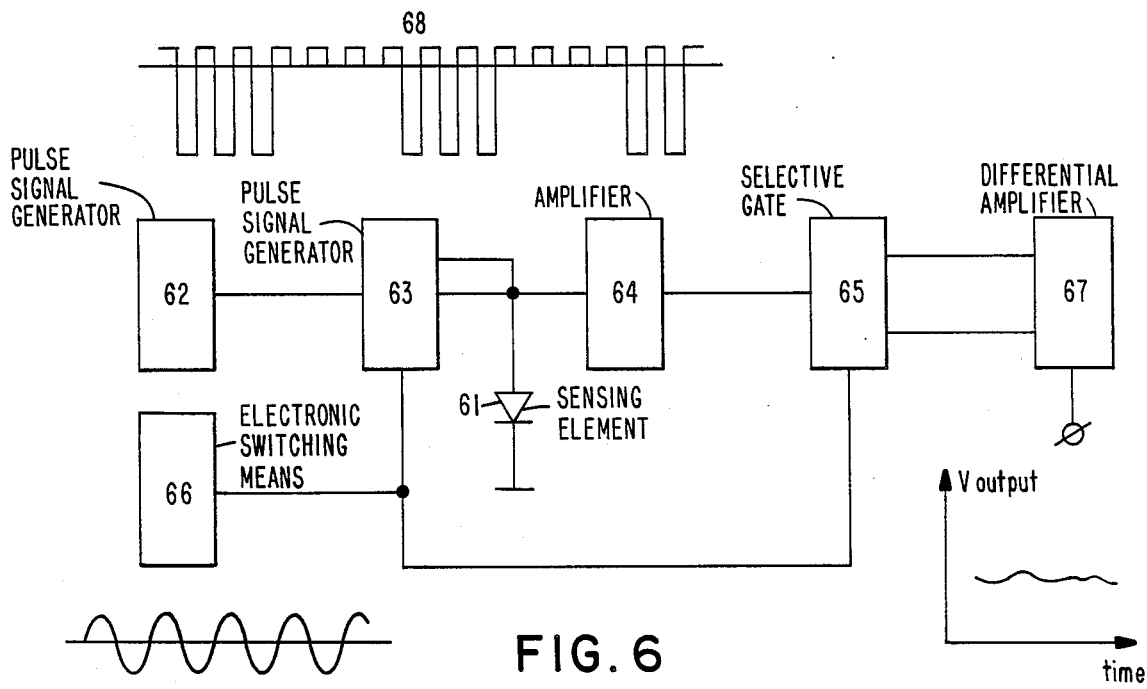

In order to further simplify the measurement system, the operation mode of a single sensor with self-compensation is adopted in the present invention. The embodiment shown in FIG. 6 can operate in such a mode. In FIG. 6, reference numeral 62, 63 and 61 designated the pulse signal generator, pulse signal separator, and sensing element of the present invention respectively. An electronic switching means 66, which can be, for example, an oscillator, is connected with pulse signal separator 63, and is used to control pulse signal separator 63 to provide sensing element 61 with different magnitude reverse and forward currents in which a series of reverse current pulses are alternatively switched on and off. The voltage waveform 68 of the pulses is shown in FIG. 6. Amplifier 64 whose input is connected to the positive terminal of sensing element 61 is used to amplify the pulse series of forward voltage drop across sensing element 61. Selective gate means 65 has its input connected with the output of amplifier 64, and gives out, from one of its outputs, a voltage signal which comes from amplifier 64 and reflects the temperature of the ambience where sensing element 61 is placed when the series of reverse current pulses are cut off, and, from the other output of it, a voltage signal which also comes from amplifier 64 and reflects not only the temperature of the ambience where sensing element 61 is placed but the parameter of the tested medium as well when the series of reverse current pulses are switched on. Selective gate means 65 comprises two sampling/holding devices which are controlled by electronic switching means 66. Differential amplifier 67, the two inputs of which are connected with the two outputs of the selective gate means, is used to obtain the self-compensated signals in which the influence of the temperature of the ambience where the sensing element is placed has been excluded that is, the electric signals, corresponding to the parameters of the tested medium.

Compared with the prior art, the present invention has the following features.

1. The heat generating and heat sensing processes of a sensor happen in the same spatial position of the same material during measurement, and the thermal resistance between the heat source and the temperature sensitive body equals zero. This completely eliminates the error resulting from the heat coupling inside the sensor, thus realizing the non-heat-hysteresis measurement which may be applied to cases, in which various physical parameters change rapidly.

2. Both the heating power and the measuring signal are transmitted through two wires for connecting the sensor to the measurement instrument, so that it is possible to transmit the measuring signal in a long distance in a simple way which is especially suitable for the remote measurement of parameters coming from the coal mine, deep sea, oil well, or dangerous environment.

3. Because the sensing element alternatively operates in backward and forward states, the intermediate signal is a series of modulated pulses, which makes it possible to overcome the drift cause by the change in temperature due to the direct coupling between the signal processing systems, and to prevent the measurement system from being affected by the fluctuation of ambient temperature. Therefore, high stability and high measurement accuracy can be obtained, and the sensor is particularly fitted for long-time and continuous monitor and measurement of small variation of various parameters.

4. Since the measuring process is based on physical effects of forward conduction and reverse breakdown of the p-n junction(s) and both effects exist in a wide range of temperature, therefore the measurement device according to the present invention are also suited to be used in such a wide temperature range, and can be comprehensively used in the refrigerating engineering, air conditioning systems, meteorological observations, fluid transportation by pipe, parameter sensing of the oil well, velocity field analysis of high temperature and high speed airflow, and engine tests.

5. Owing to the forward and backward currents applied to the sensing element in a form of time division, the heating parameter and the temperature sensing parameter are independent from each other, and hence high accuracy of measurement can be obtained in various heat-sinking conditions.

6. The sensor of very low power dissipation resulting in an appreciable reduction of power requirement for the power supply makes it suitable to small and portable equipment with a miniature power supply and suitable to remote measurement system for various parameters.

7. Because of low dynamic resistances of the sensing element in the forward conduction and reverse breakdown periods, the interference may be effectively eliminated in the signal transmission, and the accurate measurement can be conducted in the critical condition with strong electromagnetic interference.

8. The very small size sensor having negligible pertubation to the measured object is suitable for measuring distributions of various parameters in space and measuring parameters within a small tube.

9. During measurement, the sensing element substantially at the earth potential, so that no additional electric field is produced in the measurement site, which ensures the protection against danger. This advantage is of particular importance, especially when the measurement is carried out in the combustible material or the electrically conductive fluid.

10. The sensing element is of solid and integral without breakable fine wires or damageable thin film and with no other non-shock-proof components, hence it can be continuously used in violent vibration.

The present invention may be used in:
1. high sensitivity wind speed meter;
2. high sensitivity flow meter, which is especially suitable for measuring the weak, strong flow, or the velocity field of the flow associated with great mechanical shocks;
3. quick measurement of water content in soil or a substance;
4. quick measurement of the thermal insulation performance of the clothing or building material;
5. quick and accurate discrimination of the liquid level or the interface between two layers of different liquid mediums;
6. low power constant-temperature microheater which has a constant temperature tank with appreciably reduced weight, size, and power consumption;
7. accurate medical micro-thermal-probe used for surgical operation, bleeding stop in deep portion, and thermal cure in fixed and local position.
8. new type of high sensitive burglar alarm;
9. small household earthquake alarm;
10. quick measurement for the alcohol content of drinks;
11. test of the flow field and parameters of composition in the deep part of an oil well; and
12. the monitor and measurement system of various parameters with a single sensor.

What is claimed is:

1. A measurement device for measuring various parameters of non-electric quantity such as flow speed, flow rate, heat conductivity, composition, and change in vacuum of a tested medium, comprising:
    a sensing element constituted by a single p-n junction or a plurality of p-n junctions connected in series in the same direction, alternatively operating in forward condition and reverse breakdown states, and directly contacting said tested medium for carrying out heat exchange;
    a pulse signal generator having its output voltage polarity changed alternatively;
    a pulse signal separator constituted by a circuit which has different impedances for forward and backward currents and connected between said sensing element and said pulse signal generator for alternatively providing said sensing element with different magnitude backward and forward currents in accordance with the output voltage of said pulse signal generator, said circuit limiting the forward current pulse magnitude of the p-n junction to a very small value and making the reverse breakdown current pulse magnitude of the p-n junction keep a sufficient large value; and
    an electric signal measurement means for measuring electric signals related to said sensing element and corresponding to said parameters of said tested medium.

2. A measurement device as defined in claim 1, wherein value of the power provided for said sensing element by said pulse signal generator is always unchanged, said electric signal measurement means comprises:
    a first amplifier having its input connected with the positive terminal of said sensing element, for amplifying the forward voltage drop across said sensing element;
    a reference sensing element for testing temperature of ambience near to the place where said sensing element is placed;
    a second amplifier having its input connected with the output of said reference sensing element, for amplifying a voltage signal corresponding to said temperature of said ambience near to the place where said sensing element is placed;
    a differential amplifier having its two inputs connected with two outputs of said first and said second amplifiers respectively, for obtaining said signals corresponding to said parameters of said tested medium.

3. A measurement device as defined in claim 2, wherein said reference sensing element comprises a single p-n junction or a plurality of p-n junctions connected in series in the same direction.

4. A measurement device as defined in claim 1, wherein said electric signal measurement means comprises:
    a reference sensing element for testing temperature of ambience near to the place where said sensing element is placed;
    a feedback adjusting means having its two inputs connected with the output of said reference sensing element and the positive terminal of said sensing element respectively, for receiving the voltage signals corresponding to said temperature of said ambience near to the place where said sensing element is placed and the forward voltage drop across said sensing element, and having its output connected with said pulse signal generator, for providing said pulse signal generator with a signal adjusting the output power of said pulse signal generator to keep a constant value of difference between the temperature of said sensing element and the temperature of said reference sensing element;
    a signal detecting means having its input connected to the output of said pulse signal generator, for detecting electric signals corresponding to the change of the output power of said pulse signal generator to obtain electric signals corresponding to said parameters of said tested medium.

5. A measurement device as defined in claim 4, wherein said reference sensing element comprises a p-n junction or a plurality of junctions connected in series in the same direction.

6. A measurement device as defined in claim 1, wherein, said electric signal measurement means comprises:
    an amplifier having its input connected to the positive terminal of said sensing element, for amplifying the forward voltage drop across the said sensing element;
    an isolating capacitor having its one terminal connected with the output of said amplifier, for blocking the D.C. component of the output signal of said amplifier;
    a signal processing means having its input connected with the other terminal of said capacitor, for obtaining voltage signals corresponding to the rates of said parameters of said tested medium.

7. A measurement means as defined in claim 6, wherein said signal processing means is an amplifier.

8. A measurement device as defined in claim 1, wherein, said electric signal measurement means comprises:
- an amplifier having its input connected to the positive terminal of said sensing element, for amplifying the forward voltage drop across said sensing element;
- a D.C. reference voltage source means for providing a D.C. reference voltage;
- an operational amplifier having its one input connected with the output of said amplifier and the other input connected with the output of said D.C. reference voltage source means;
- a control means having its input connected with the output of said operational amplifier and its output connected with said pulse signal generator, for controlling the output power of said pulse signal generator to make the temperature of said sensing element constant;
- a signal detecting means having its input connected to the output of said pulse signal generator, for detecting the electric signals corresponding to the change of the output power of said pulse signal generator to obtain the electric signals corresponding to said parameters of said tested medium.

9. A measurement device as defined in claim 1, wherein said electric signal measurement means comprises:
- an electronic switching means connected to said pulse signal separator to alternatively switch on and off a series of reverse current pulses provided for said sensing element;
- an amplifier having its input connected to the positive terminal of said sensing element, for amplifying the pulse series of forward voltage drop across said sensing element;
- a selective gate means comprising two sampling-/holding devices which are controlled by said electronic switching means and having its input connected with the output of said amplifier, and having two outputs giving out, from one of said outputs, forward voltage signals corresponding to both temperature of ambience where said sensing element is placed and parameter of tested medium, and from the other output, forward voltage signals corresponding to only said temperature of said ambience where said sensing element is placed;
- a differential amplifier having its two inputs connected with said two outputs of said selective gate means respectively, for obtaining self-compensated signals removed from the influence of ambient temperature in the position occupied by said sensing element, that is, the electric signals corresponding to said parameters of said tested medium.

10. A measurement device as defined in claim 9, wherein, said electronic switching means is an oscillator connected with said selective gate means.

11. A highly accurate constant-temperature source comprising:
- a sensing element constituted by a single p-n junction of a plurality of p-n junctions connected in series in the same direction and alternatively operating in in forward condition and reverse breakdown states;
- a pulse signal generator having its output voltage polarity changed alternatively;
- a pulse signal separator connected between said sensing element and said pulse signal generator, for alternatively providing said sensing element with backward and forward currents of different magnitudes in accordance with the output voltage of said pulse signal generator; and
- a feedback adjusting means having its input connected to the positive terminal of said sensing element and its output connected to said pulse signal generator, for producing feedback signals which adjust the output power of said pulse signal generator so as to keep the temperature of said sensing element constant.

12. A highly accurate constant-temperature source as defined in claim 11, wherein said feedback adjusting means comprises:
- an amplifier having its two inputs connected with two outputs of said amplifier and said D.C. reference voltage source means respectively, for producing a signal corresponding to the temperature change of the tested medium;
- a control means having its input and output connected with said operational amplifier and said pulse signal generator respectively, for producing a control signal which controls the output power of said pulse signal generator so as to keep the temperature of said sensing element constant.

* * * * *